June 29, 1965 W. F. SCHMITT 3,192,369

PARALLEL ADDER WITH FAST CARRY NETWORK

Filed Aug. 17, 1961 7 Sheets-Sheet 1

INVENTOR
WILLIAM F. SCHMITT

BY John R. Manning

AGENT

PARALLEL ADDER WITH FAST CARRY NETWORK

Filed Aug. 17, 1961 7 Sheets-Sheet 2

June 29, 1965 W. F. SCHMITT 3,192,369

PARALLEL ADDER WITH FAST CARRY NETWORK

Filed Aug. 17, 1961 7 Sheets-Sheet 3

June 29, 1965 W. F. SCHMITT 3,192,369

PARALLEL ADDER WITH FAST CARRY NETWORK

Filed Aug. 17, 1961 7 Sheets-Sheet 6

UNIT MATRIX HALF-ADDER

United States Patent Office 3,192,369 Patented June 29, 1965

3,192,369

PARALLEL ADDER WITH FAST CARRY NETWORK

William Francis Schmitt, Wayne, Pa., assignor to Sperry Rand Corporation, New York, N.Y., a corporation of Delaware Filed Aug. 17, 1961, Ser. No. 132,027
11 Claims. (Cl. 235—175)

This invention relates to electronic digital computing devices and more particularly to electronic digital computing devices of the parallel adder type.

It is of particular importance in computer operations that the speed at which mathematical processes are performed be as fast as possible. According to the present invention, addition operations are accompanied by an inherent shift whereby, operations such as multiplication by over and over addition are accomplished at a much higher rate of speed than was heretofore possible. The greater speed obtainable is accomplished by elimination of the carrying network and inherent delay associated with the circuits for injecting the carries in the operation of a parallel adder circuit.

The parallel adder circuit of the present invention is adaptable for use in the addition of numbers with any radix; however, since the binary and decimal systems of counting are more widely used, the circuit of the present invention discloses an embodiment directed to the addition of numbers represented by pulse bits, in the decimal system of notation.

The present invention relates specifically to electronic computing equipment and in particular to an adder circuit for operating on a series of pulses representing a multiplicand and a multiplier factor coupled from a multiples generator and producing several series of pulses that may be applied to electronic counting equipment so as to register any product of said multiplicand a multiplier factor. The process of multiplication as performed by over and over addition, comprises the formation of partial products and the summation of these partial products to arrive at a final product. If a multiples generator is available for providing a train of pulses representative of the multiples of the multiplicand as selected by the digits of the multiplier, then the multiples so formed are known as partial products and the summation of these partial products, accompanied by the necessary shifts, will permit the generation of a final product. Many large scale computing systems must allow for maximum carry time period in each addition operation since it is possible for a carry generated in the first position to ripple through to the highest order position of the adder from the lower orders. An illustration of such a case would be in the addition of the decimal number 7 expressed in binary form as 0111 and the decimal number 1 expressed in binary form as 0001. From the addition of these two numbers it will be noted that the carry will ripple or is propagated from the lowest order position, order by order, to the fourth order position to arrive at the binary sum 1000. A propagation of the carry consumes time and the resulting delay is cumulative. Accordingly, the time allotted for the carry process must be determined on the basis of the worst possible case which would be the time it takes the carry to ripple through all the orders of the adder, although the average carry sequences are shorter in time than the maximum.

Since higher computation speeds are desirable, some increase in speed of operation should be expected to result from the decrease in operation time of basic arithmetical apparatus. The ripple carry or carry propagated carry process is one such operation in which significant decreases in time may be accomplished since the determination of the sum in any bit of the adder may have to wait for the carry signal to propagate through all the lower order bits.

For the purposes of this invention, a "normal carry" or a "carry" is that which results when the radix of a number is reached as a result of an addition process. This carry is then directed to the next higher order to be added into that order. A "ripple carry" or "a carry propagated carry" is defined as that which results when a carry from a stage N–2, causes a stage N–1, then set at nine to produce a carry into stage N. The latter, known as the ripple carry, must be added to the partial products in order to arrive at a correct final product. Except for the addition of the ripple carries after all partial products have been summed, the ripple carry so generated during summation of the partial products is recirculated and added with the summed partial products during the next time pulse time. This is permissible since the summed partial products are shifted to the next lower order at the conclusion of the time pulse. Any ripple carries generated after all partial products have been summed are known as "final carries" carry and are added by a final carry network to the summed partial products at the last time pulse of the period. Since the carry network to perform ripple carries has been practically eliminated and the inherent delay associated with this operation diminished, faster computation speeds result. The adder circuit of the present invention may be operated at any speed which still permits the circuits to "settle." No cycle time is allotted for carriers to ripple through the adder stages since, as hereinbefore cited, the ripple carries are added in at the next following time pulse along with the summed partial products also appearing at the input of a unit matrix half-adder.

Therefore, it is an object of this invention to improve and increase the speed of operation of electronic digital computing devices.

A further object of this invention is to increase the speed of the multiplication process performed by the over and over addition method.

It is a still further object of the present invention to eliminate the ripple carry networks and inherent delay associated with a parallel adder.

It is a further object of the present invention to increase the speed of operation of adding circuits by adding the ripple carries or carry propagated carries into the summed partial products at the same time that the next succeeding partial product is presented to the adder.

Other objects of the invention will be pointed out in the following description and claims illustrated in the accompanying drawings, which disclose, by way of example, a principle of the invention and the best mode which has been contemplated of applying that principle.

A more detailed description of the invention will be given with reference to the accompanying drawing, in which:

FIGURES 1*a*, 1*b*, 1*c* and 1*d*, placed from right to left in that order, form the block diagram of an adder circuit constructed in accordance with the principles of the present invention and having 6 stages;

The apparatus illustrated and described is a parallel adder circuit. In the specific embodiment shown, the decimal system of operation is described. However, by minor modifications known to those skilled in the art, the system can be operated in any radix such as a radix of 2 (binary), 5 (quinary), etc. The only modification necessary, for example, to modify the circuit of the present invention to operate on the binary system, would be to inhibit the 2 through 9 conductors which will then cause the half-adder to generate a carry upon addition of a pulse to a "1." In the present system shown and described, which is the decimal system, a carry is generated upon the addition of the carry pulse to a "9."

Figure 1A:
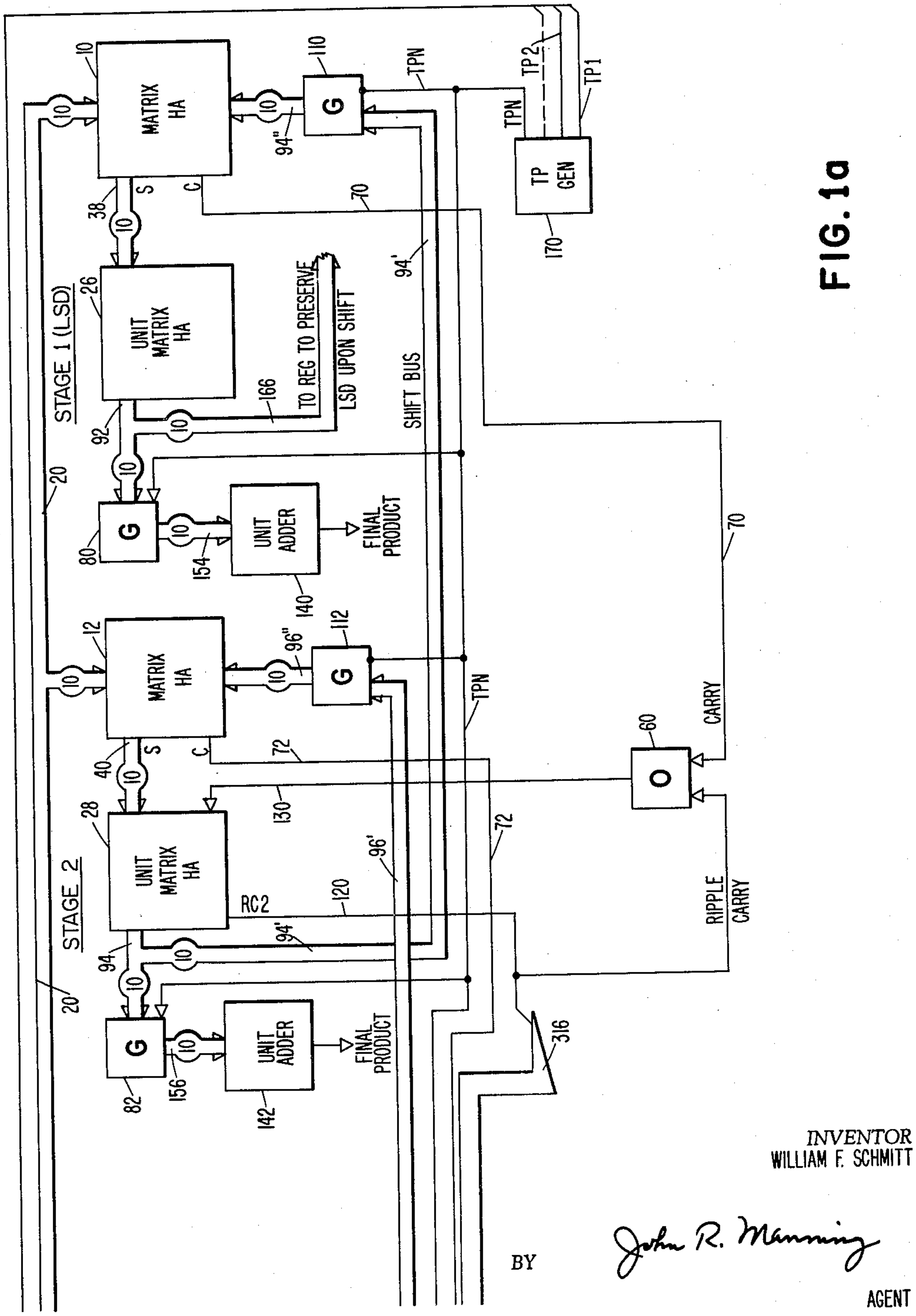
Figure 1B:
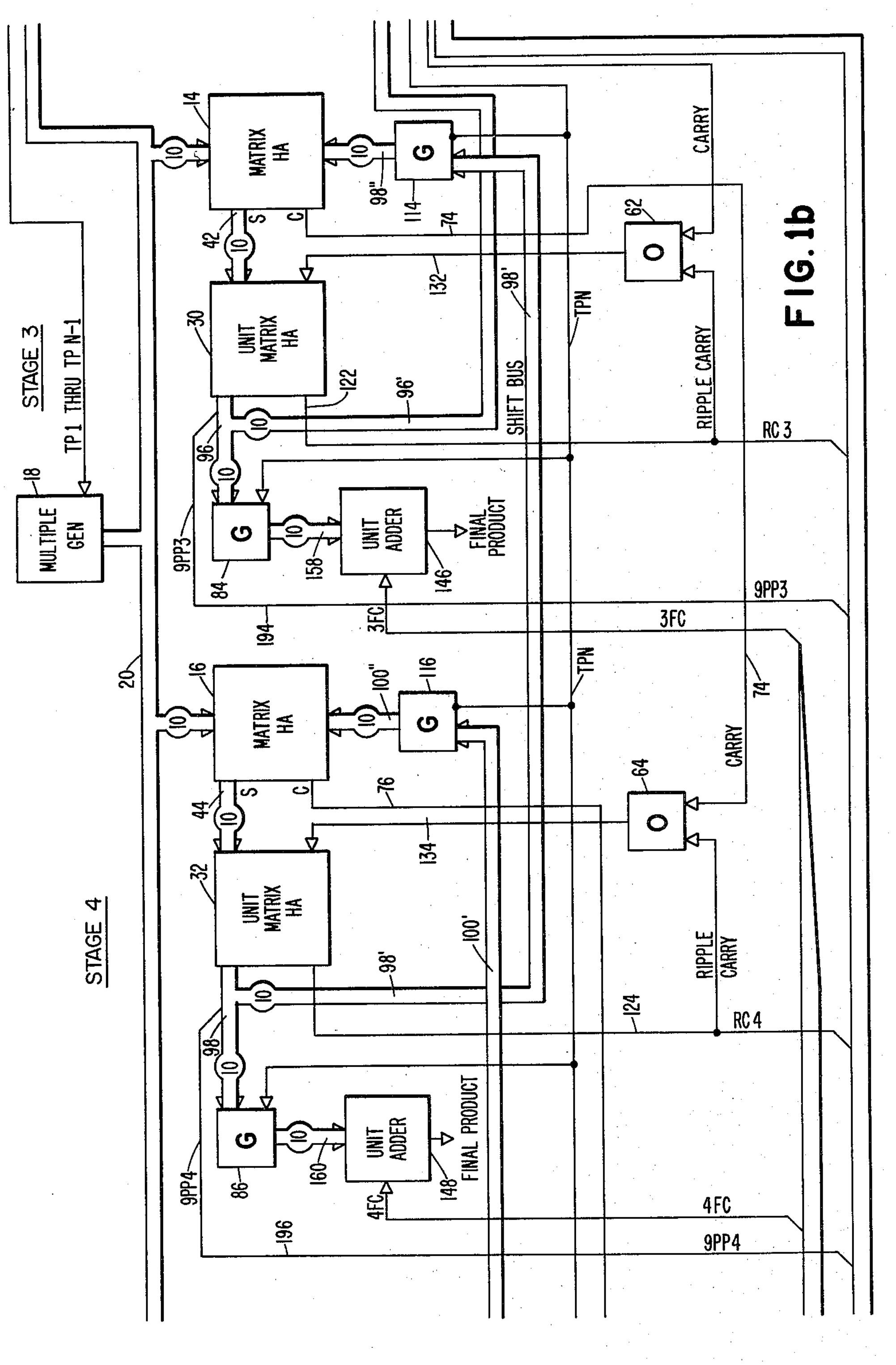
Figure 1C:
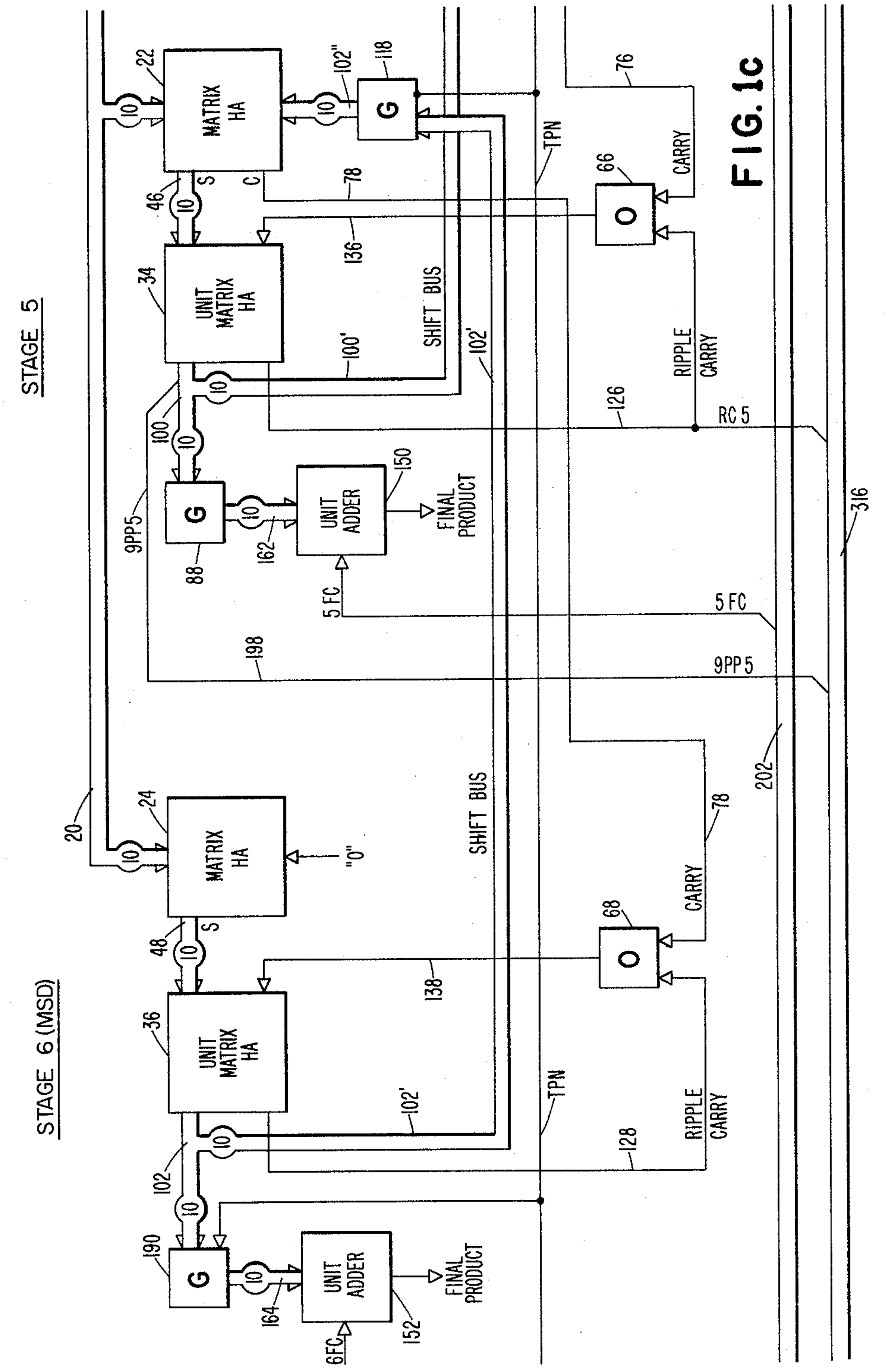

As shown by FIGURES 1*a*, 1*b* and 1*c*, the multiple generator 18 supplies pulses representative of the multiples of the multiplicand over the conductors of the cable 20 to the matrix half-adders (HA) 10, 12, 14, 16, 22 and 24. It will be understood and apparent that any number of stages may be employed and that in the present invention, 6 stages are shown merely to illustrate and describe the invention. Multiples of the multiplicand, as determined by the digits of the multiplier, may be generated and directed to the matrix half-adders in any convenient method. One such circuit for generating multiples in the binary system is shown on pages 158 and 159 of "Arithmetic Operations in Digital Computers" by R. K. Richards, and published by D. Van Nostrand Company, Inc. (1955). An arrangement for obtaining the 9 multiples of the multiplicand is shown in the same book at page 258. Although block diagrams of the adder, doubler, and quintupler are shown in the arrangement on page 258, the logical blocks of the circuits will be found on the preceding pages of the aforementioned book. It will be evident to those skilled in the art, that if a number system having a radix other than 2 or 10 is to be employed, suitable circuits can be derived.

Each of the matrix half-adders 10, 12, 14, 16, 22 and 24 have their outputs coupled to the inputs of unit matrix half-adders 26, 28, 30, 32, 34 and 36 via the conductors of the cables 38, 40, 42, 44, 46 and 48. In addition, the carry outputs of the matrix half-adders 10, 12, 14, 16 and 22 are connected to OR circuits 60, 62, 64, 66 and 68, respectively, via the condutcors 70, 72, 74, 76 and 78, respectively.

The unit matrix half-adders 26, 28, 30, 32, 34 and 36 of the FIGURES 1*a*, 1*b*, and 1*c*, direct their outputs to the gates 80, 82, 84, 86, 88 and 90, respectively, via the conductors of the cable 92, 94, 96, 98, 100 and 102. The shifting of the summed partial products is accomplished by also directing the outputs of the unit matrix half-adders 26, 28, 30, 32, 34 and 36 to the gates 110, 112, 114, 116, and 118 via the conductors of the cables 94′, 96′, 98′, 100′ and 102′ respectively. The gates 110, 112, 114, 116 and 118 are associated with the next lower order so that the shifting of the summed partial products is accomplished. The outputs of the gates 110, 112, 114, 116, and 118 are coupled to the inputs of the matrix half-adders 10, 12, 14, 16 and 22 by the conductors of the cables 94″, 96″, 98″, 100″ and 102″, respectively.

The carries from the unit matrix half adders 28, 30, 32, 34, and 36 of the FIGURES 1*a*, 1*b*, 1*c*, are known as the ripple carries. As noted earlier, the ripple carries are recirculated and directed back as an input to the same unit matrix half adder from which it originated. In the case of the unit matrix half adder 28 of the FIGURE 1*a*, the ripple carry is directed to the OR circuit 60 via the conductor 120; the output of the unit matrix half adder 30 of the FIGURE 1*b* is directed to the OR circuits 62 via the conductor 122; the ripple carry output of the unit matrix half adder 32 of the FIGURE 1*b* is coupled to the OR circuit 64 via the conductor 124; the ripple carry output of the unit matrix half adder 34 of the FIGURE 1*c* is connected to the OR circuit 66 via the conductor 126; and, the ripple carry generated by the unit matrix half adder 36 of the FIGURE 1*c* is coupled to the OR circuit 68 by the conductor 128.

The ripple carries and the carry from the lower order are coupled to the input of the unit matrix half adders 28, 30, 32, 34 and 36 via the OR circuits 60, 62, 64, 66, and 68, respectively, via the conductors 130, 132, 134, 136, and 138.

The gates 80, 82, 84, 86, 88 and 90 direct their outputs upon final product to the unit adders 140, 142, 146, 148, 150 and 152 via the conductors of the tables 154, 156, 158, 160, 162 and 164. The outputs of the unit adders 140, 142, 146, 148, 150 and 152 may be coupled to the input of any convenient storage means, capable of storing an amount representative of the final product.

As shown in the FIGURE 1*a*, the unit matrix half adder 26 will also direct its output to a register (not shown) upon the conductors of the cable 166. The conductor of the cable 166 will transfer the shifted digits to the register in order that the digits shifted from the next higher stage will be preserved.

As shown in FIGURE 1*a*, the time pulse generator 170, which may be a usual sequence generator with the repetition rate chosen so that the units have settled and have properly accounted for any operands and carries necessary for correct operation of the circuit, before the entry of the next group of operands (multiples). The time pulses generated by the time pulse generator 170 are coupled to the multiple generator 18 in the FIGURE 1*b* and control the transfer of the multiples representing the partial products from the generator 18 to the matrix half adders 10, 12, 14, 16, 22 and 24 via the conductors of the cable 20. It is necessary that the cycle of operation of the time pulse generator 170 contain a number of time pulses equal to the number of partial products to be transferred plus one additional time pulse. The additional time pulse is necessary for the addition of the final ripple carries. For example, if four partial products are to be entered, the cycle of the time pulse generator 170 would be from TP1 through TP5. Partial products would be entered during TP1 through TP4 and at TP5, (shown on the drawing as $TP_N$) the final ripple carries would be entered to form the final product.

The final time pulse of the time pulse generator is utilized too, as herein before noted, to add the final ripple carries and during this process, the shift conductors must be inhibited and the final carry network activated. The shift conductors of the shift busses 94′, 96′, 98′, 100′ and 102′ are inhibited by the application of $TP_N$ to the inhibit gates 110, 112, 114, 116 and 118, respectively. In addition, $TP_N$ is applied to the gates 80, 82, 84, 86, 88, and 90 to permit the read out of the final product to the unit adders 140, 142, 146, 148, 150 and 152. As noted earlier, the final ripple carries, also known as final carries, are added in the unit adders 140, 142, 146, 148, 150, and 152. In addition, $TP_N$ is applied to the AND gates 180, 182, 184, 186, 188, 190, and 192 shown in the FIGURE 1*d*.

Figure 1D:
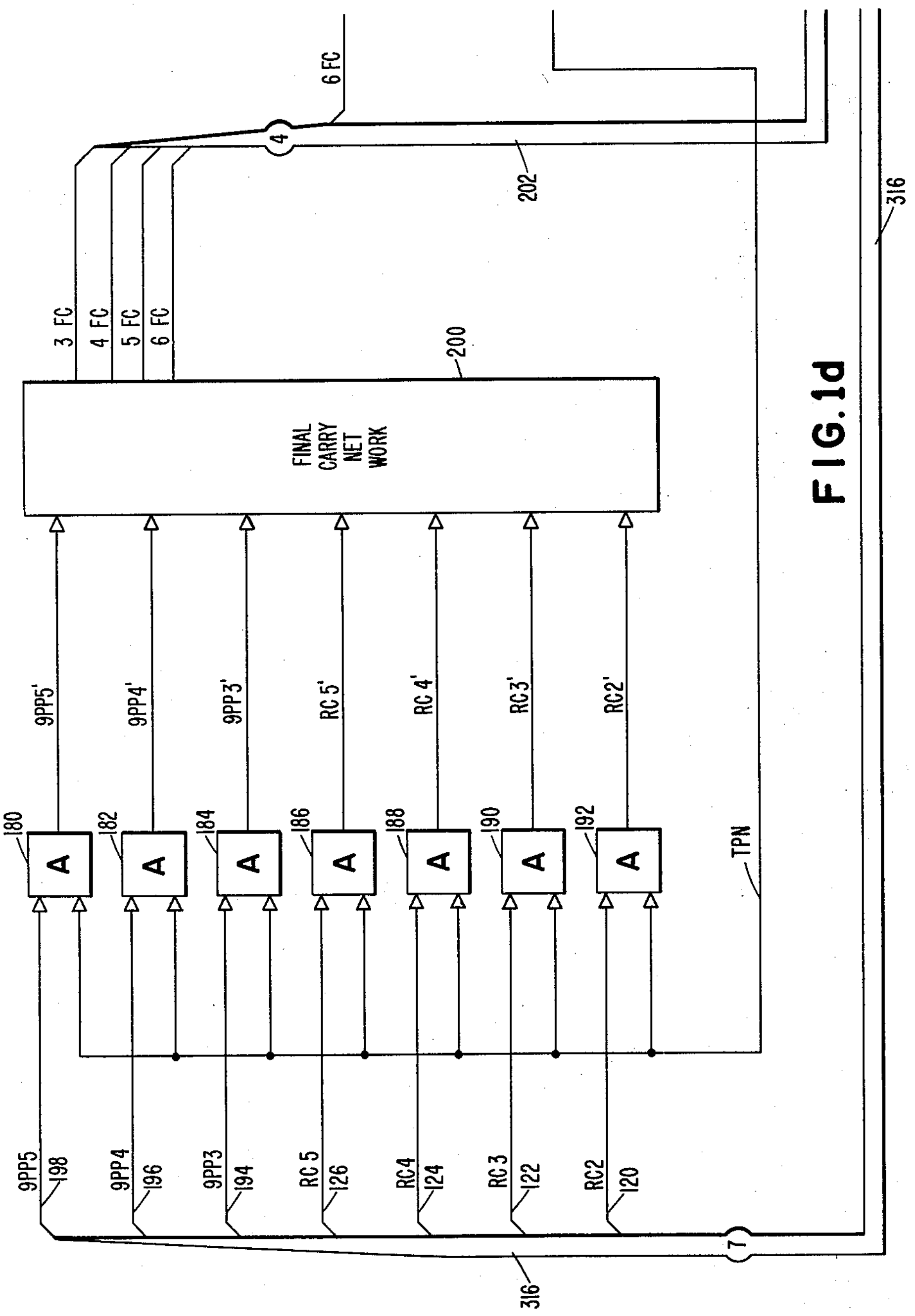

The circuitry of FIGURE 1*d* comprises the final carry network and is utilized only when the final product has been arrived at except for the ripple carries generated upon summation of the final partial products to the sumed partial products. The ripple carry conductor 120 (RC2) of FIGURE 1*a* is coupled to pulse the gate 192 of the FIGURE 1*d*; the ripple carry conductor 122 (RC3) is coupled to the gate 190 of FIGURE 1*d*; a ripple carry conductor 124 (RC4) is coupled to the AND gate 188; the ripple carry conductor 126 (RC5) is coupled to the AND gate 186. In addition, the unit matrix half adders 30, 32, and 34 of the FIGURES 1*b* and 1*c* are sensed by the conductors 194, 196, and 198, respectively, to determine if those elements have been set to their nine positions which can then cause a ripple carry into the next higher stage. The conductor 194, labeled 9 PP digit 3, (the 9 partial product of the third stage) is connected to the gate 184 of the FIGURE 1*d*. Similarly, conductors 196 (digit 9 PP4) and conductor 198 (9 PP5) are connected to the AND circuits 182 and 180 respectively. The outputs of the gates 180, 182, 184, 186, 188, 190, and 192 are coupled to the final carry network 200 whose outputs are the conductors 3FC (final carry for the third stage), 4FC, 5FC, and 6FC are directed to the unit adders 146, 148, 150, and 152 over the conductors of the cable 202 to cause those unit adders to add in a ripple carry if generated in the next lower order upon summation of the final partial product to the sum partial products.

OPERATION—TABLE I

For the purposes of explanation of the operation of the circuit of the present invention, the following illustrative problem of multiplication by over and over addition will be performed. It will be understood that a numbering system utilizing any radix may be employed with but slight modification and further, that an adder having any number of stages may be employed.

| | |
|---|---|
| 8 9 3 4 | Multiplicand |
| 7 8 5 6 | Multiplier |
| 5 3 6 0 4 | 1st Partial Product |
| 4 4 6 7 0 | 2nd Partial Product |
| 7 1 4 7 2 | 3rd Partial Product |
| 6 2 5 3 8 | 4th Partial Product |
| 7 0 1 8 5 5 0 4 | Final Product |

Figure 4:
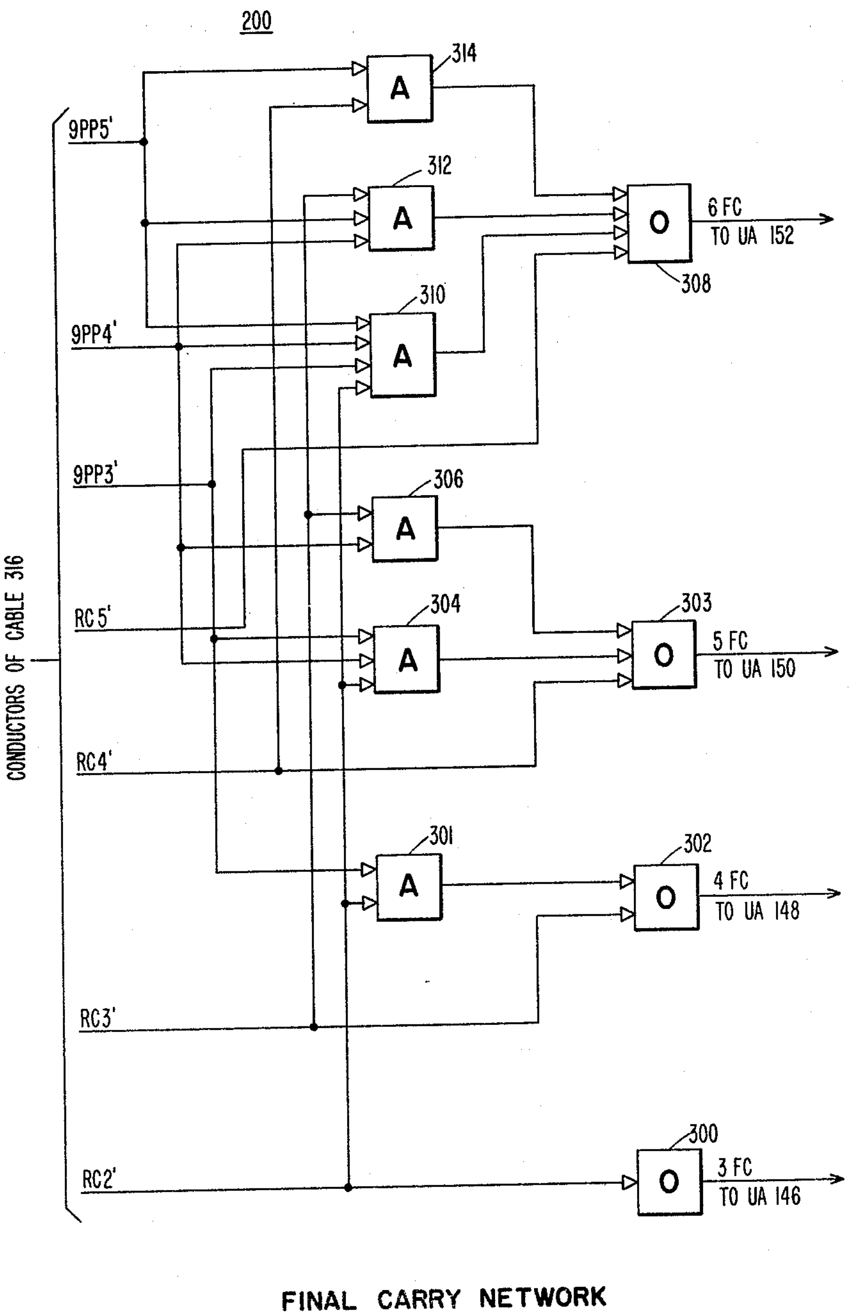

The adder of the present invention operates to form a final product in the following manner:

| | | | | | | | |
|---|---|---|---|---|---|---|---|
| Stage | 6 | 5 | 4 | 3 | 2 | 1 | |
| Matrix HA | 24 | 22 | 16 | 14 | 12 | 10 | |
| Or | | | | | | | |
| Unit Matrix HA | 36 | 34 | 32 | 30 | 28 | 26 | |
| TP1 | | | | | | | |
| | 0 | 5 | 3 | 6 | 0 | 4 | Inputs and outputs of Matrix HA |
| | 0 | 0 | 0 | 0 | 0 | 0 | |
| | 0 | 5 | 3 | 6 | 0 | 4 | Input to Unit Matrix HA |
| | 0 | $\overline{C}$ | $\overline{C}$ | $\overline{C}$ | $\overline{C}$ | $\overline{C}$ | |
| Or | $\overline{RC}$ | $\overline{RC}$ | $\overline{RC}$ | $\overline{RC}$ | $\overline{RC}$ | 0 | |
| | 0 | 5 | 3 | 6 | 0 | 4* | Output of Unit Matrix HA |
| | $\overline{RC}$ | $\overline{RC}$ | $\overline{RC}$ | $\overline{RC}$ | $\overline{RC}$ | 0 | |
| TP2 | | | | | | | |
| | 0 | 0 | 5 | 3 | 6 | 0 | Inputs to Matrix HA |
| | 0 | 4 | 4 | 6 | 7 | 0 | |
| | 0 | 4 | 9 | 9 | 3 | 0 | Outputs of Matrix HA |
| | 0 | $\overline{C}$ | $\overline{C}$ | $\overline{C}$ | C | $\overline{C}$ | |
| | 0 | 4 | 9 | 9 | 3 | 0 | Inputs to Unit Matrix HA |
| | 0 | $\overline{C}$ | $\overline{C}$ | $\overline{C}$ | C | $\overline{C}$ | |
| Or | $\overline{RC}$ | $\overline{RC}$ | $\overline{RC}$ | $\overline{RC}$ | $\overline{RC}$ | 0 | |
| | 0 | 4 | 9 | 0 | 3 | 0* | Outputs of Unit Matrix HA |
| RC Here | $\overline{RC}$ | $\overline{RC}$ | $\overline{RC}$ | RC | $\overline{RC}$ | 0 | |
| TP3 | 0 | 0 | 4 | 9 | 0 | 3 | Inputs to Matrix HA |
| | 0 | 7 | 1 | 4 | 7 | 2 | |
| | 0 | 7 | 5 | 3 | 7 | 5 | Outputs of Matrix HA |
| | 0 | $\overline{C}$ | $\overline{C}$ | C | $\overline{C}$ | $\overline{C}$ | |
| | 0 | 7 | 5 | 3 | 7 | 5 | Inputs to Unit Matrix HA |
| | 0 | $\overline{C}$ | $\overline{C}$ | C | $\overline{C}$ | $\overline{C}$ | |
| Or | $\overline{RC}$ | $\overline{RC}$ | $\overline{RC}$ | RC | $\overline{RC}$ | 0 | |
| | 0 | 7 | 6 | 4 | 7 | 5* | Outputs of Unit Matrix HA |
| | $\overline{RC}$ | $\overline{RC}$ | $\overline{RC}$ | $\overline{RC}$ | $\overline{RC}$ | 0 | |
| TP4 | 0 | 0 | 7 | 6 | 4 | 7 | Inputs to Matrix HA |
| | 0 | 6 | 2 | 5 | 3 | 8 | |
| | 0 | 6 | 9 | 1 | 7 | 5 | Outputs of Matrix HA |
| | 0 | $\overline{C}$ | $\overline{C}$ | C | $\overline{C}$ | C | |
| | 0 | 6 | 9 | 1 | 7 | 5 | Inputs to Unit Matrix HA |
| | 0 | $\overline{C}$ | $\overline{C}$ | C | $\overline{C}$ | C | |
| Or | $\overline{RC}$ | $\overline{RC}$ | $\overline{RC}$ | $\overline{RC}$ | $\overline{RC}$ | 0 | |
| | 0 | 6 | 0 | 1 | 8 | 5 | Outputs of Unit Matrix HA |
| RC Here | $\overline{RC}$ | $\overline{RC}$ | RC | $\overline{RC}$ | $\overline{RC}$ | 0 | |
| $TP_N$ | 0 | 6 | 0 | 1 | 8 | 5 | To Gates 80, 82, 84, 86, 88, 90. |
| | 0 | $\overline{RC}$ | RC | $\overline{RC}$ | $\overline{RC}$ | 0 | To Final Carry Network, Figs. 1d and 4. |
| | 0 | 7 | 0 | 1 | 8 | 5 | Final Product From Unit Adders |

*Digits shifted out to register (not shown).

| 0 7 0 1 8 5 | 5 0 4 |
|---|---|
| Final Product from Unit Adders | Final Product Stored in Register (not shown) |

Figure 2:
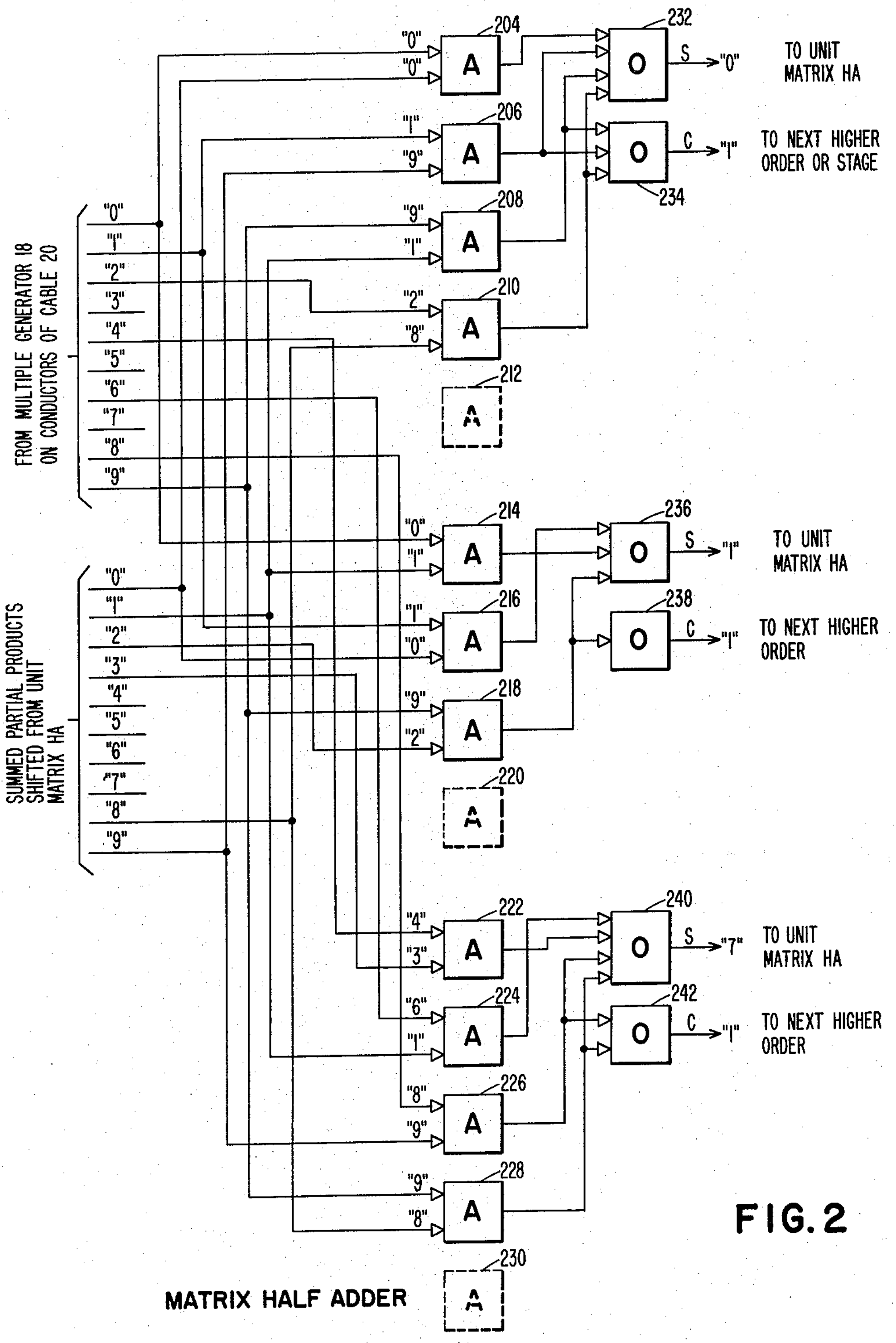
FIGURE 2 is a logical block diagram of a matrix half-adder employed in the present invention.
Figure 3:
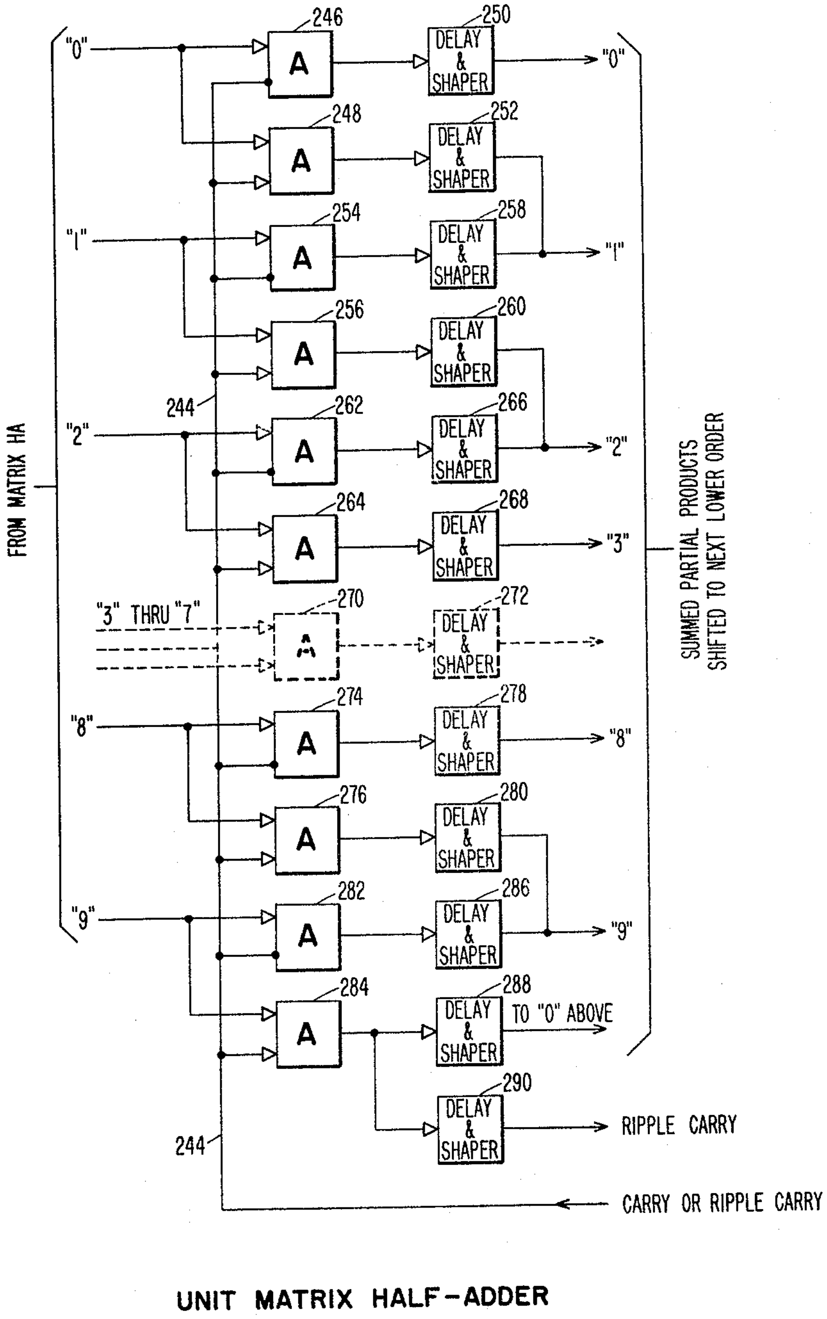
FIGURE 3 is a logical block diagram of a unit matrix half-adder utilized in the adder stages of the present invention; and, FIGURE 4 is a logical block diagram of the final carry network utilized in the present invention.

Before the above set out operation is described in detail, reference is made to FIGURES 2, 3, and 4 in order to permit understanding of the remaining circuitry required for proper operation.

The matrix half adders 10, 12, 14, 16, 22 and 24 of the FIGURES 1*a*, 1*b*, and 1*c* are shown in logical block diagram in FIGURE 2. The matrix half adder 24 of FIGURE 1*c* is identical to the other matrix half adders except for the "0" input conductor. It will be noted that since matrix half adder 24 is located in the highest order stage, no shifting into this stage is performed and thus "0's" are continually injected. The matrix half adder of FIGURE 2 will accept two signals representing the augend and addend digits and produce output signals representing the sum and carry in accordance with the conventional outputs of a half adder. The particular representation of the matrix half adder of FIGURE 2 is in decimal logic and can be readily changed to any radix as desired. For example, if the binary system is to be employed, the gates and circuits will be so arranged that the presentation of a "0" augend digit and a "0" addend digit will produce a "0" sum digit and a "0" carry digit. The presentation of a "1" augend digit and a "1" addend digit will produce a "0" sum digit and a "1" carry digit. The presentation of a "1" augend digit and a "0" addend digit or vice versa will produce a "1" sum digit and a "0" carry digit.

As noted, the half adders of the present invention are matrix half adders and that minor circuit modifications will permit a system to operate on any desired radix. For the purposes of this invention, the decimal system has been selected and the circuits are illustrative of that system.

The purpose of the matrix half-adder of FIGURE 2 is to receive an input signal on one of the conductors of the upper group (from multiply generator 18 on conductors of cable 20) and a signal on one of the conductors from the lower group "summed partial products shifted from unit matrix half adders" and form the sum and carry of the numbers thus presented to the matrix. Although various configurations are necessary for a complete matrix half-adder, only the sum and carry of the digits "0," "1," and "7," are shown for illustrative purposes. If a "0" from the multiple generator 18 is summed with a "0" from the higher order unit matrix half adder at the AND gate 204, then a "0" sum is derived from the OR circuit 232 which is coupled to the output of the AND gate 204. Similarly, if a "1" from the multiple generator 18 is summed with a "9" from the unit matrix half adder at the AND gate 206 a sum of "0" will be derived at the output of the OR circuit 232 and a carry "1" will be derived at the output of the OR circuit 234, the circuits 232 and 234 being coupled to the output of the AND circiuit 206. Any other combinations of digits to arrive at a "0" sum and a carry are utilized to derive a complete matrix. Two additional examples are shown such as the "9" and the "1" inputs to the AND circuit 208 and the "2" and "8" digits to the AND gate 210.

Similarly, all combinations of digits (1 from the upper group and one from the lower group) are directed to the inputs of AND circuits such as 214, 216, 218, to arrive at either a sum of "1" and no carry or a sum of "1" and a carry. The illustrative embodiment to derive these combinations are coupled to the OR circuits 236 and 238.

A sum of "7" is derived by the addition of a "4" and a "3" such as at the AND gate 222 or the addition of a "6" and a "1" such as at the AND gate 24. In outputs of these AND gates 222 and 224 are directed to the OR circuit 240. A sum of "7" and a carry (of "1") are derived by the addition of an "8" and a "9" at the gate 226 or the addition of a "9" and an "8" at the gate 228. The output of the AND gate 226 is directed to both the OR circuits 240 and 242. Similarly, the AND circuit 228 has its output coupled to the OR circuits 240 and 242.

The blocks 212, 220, and 230, shown drawn in dotted line are merely illustrative of additional combinations of numbers, one each from the multiple generator and from the higher order matrix half adder, which can be summed to form output signals representing the sum and carry in accordance with the conventional notation.

FIGURE 3 shows a logical diagram of a unit matrix half-adder such as used in the circuit of the block diagram. The unit matrix half adders 28, 30, 32, 34 and 36 are identical. Unit matrix half adder 26 is similar to the other unit matrix half adders and differs only in that it does not receive a carry signal nor does it generate a ripple carry signal.

The purpose of the unit matrix half adder is to receive the sum outputs of the matrix half adders and add a carry or a ripple carry (hence the term unit) to that sum received from the matrix half adders. It will be noted at this point that both a carry and a ripple carry cannot be received into the same unit matrix half adder at the same time. For example, if a carry is generated on the conductor 72 of the FIGURE 1*a* to the OR circuit 62 of the FIGURE 1*b* and directed to the unit matrix half adder 30, and further, this carry is to be added with a "9" from the matrix half adder 14, the output will be a 0 which is shifted back to the matrix half adder 12 and a ripple carry on the conductor 122 to the OR circuits 62 which will be added in at the subsequent operation at the unit matrix half adder 30. Since a 0 has now been presented to the matrix half adder 12 by the 0 conductor of the cable 96'', no digit on the conductors of the cable 20 can be added to the "0" already presented to exceed the radix and thereby form a carry. Subsequently, the ripple carry to the unit matrix half adder 30 will then be added in that half adder and no carry on the conductor 72 to the OR circuit 62 is possible at that time. In other words, the addition of any two digits can at most result in only a sum and a single carry and never a double carry. If a ripple carry has occurred, the condition of that half adder is then at a 0 and no single digit can be added to that 0 to again exceed the radix thus causing a carry.

The unit matrix half-adder of FIGURE 3 will accept a pulse on one of the digit lines representative of that digit and add to that digit a carry or a ripple carry if such is present. Thus, the 0 digit line from a matrix half adder is connected to the AND inhibit gate 246 and the AND gate 248. If a carry or a ripple carry on the conductor 244 is to be added to the "0" input from the matrix half adder, then the gate 246 will be inhibited and the gate 248 will produce a sum of "1" at the output of the delay and shaper circuit 252 which is coupled to the output of the AND gate 248. No carry or no ripple carry is to be added to the "0" input from the matrix half adder, then the gate 248 will produce no output but the gate 246 will produce an output to the delay and shaper circuit 250 and thus producing a "0" sum at the output of that circuit. Similarly, the one digit input line is connected to the inhibit AND gate 254 and the AND gate 256 whose outputs are connected to the delay and shaper circuits 258 and 260 respectively. The outputs of delay and shaper circuits 252 and 258 are commoned so as to furnish a single output line. The "2" digit line is connected to the inhibit AND inhibit circuit 262 and the AND circuit 264 whose outputs are coupled to the delay and shaper circuits 266 and 268 respectively. The digit lines from "3" to and including "7" are coupled in a manner similar to those herein before described and are represented as being connected to circuits similar to those shown and are shown by the blocks 270 which is the AND gate having its output coupled to the delay and shaper circuit 272. The "8" digit line is coupled to the AND inhibit circuit 274 and to the AND circuit 276 whose outputs are coupled to the delay and shaper circuits 278 and 280 respectively. The "9" digit line is coupled to the AND inhibit circuit 282 and to the AND circuit 284. The output of the AND inhibit circuit 282 is coupled to the delay and shaper circuit 286 and the output of the AND circuit 284 is coupled to the parallel delay and shaper circuits 288 and 290. If no carry or no ripple carry is to be added to the "9" digit line, then only the gate 282 produces an output to the delay and shaper circuit 286 on the "9" digit line. If a carry or a ripple carry is to be added to the "9" digit line, then the AND gate 284 is activated and a sum of "0" appears from the output of the delay and shaper circuit 88 and a ripple carry is derived from the output of the delay and shaper circuit 290.

The delay circuits of FIGURE 3 may be of the conventional one digit delay type such that the output of the unit matrix half adder, now representing the summed partial products, is shifted and presented to the lower order matrix half adder at the same time that the next partial product from the multiple generator 18 is presented to that matrix half adder. The shaper circuit may be of conventional design so that the pulses representative of the bits may be reshaped before being presented to the next lower order matrix half adders. Further, the AND gates, the OR circuits and the inhibit circuits may be of conventional design and utilizing any known components such as those presented in the aforementioned Richard's publication.

In addition, the unit adders 140, 142, 146, 148, 150 and 152 of the FIGURES 1*a*, 1*b*, and 1*c* may be of a design similar to the unit matrix half-adder of FIGURE 3 except that the delay and shaper circuits are not needed. The unit adders 140, 142, 146, 148, 150 and 152 are utilized only at final read out of the product when the final ripple carries are to be added to arrive at a correct final product. This operation will herein be described in detail.

The purpose of the final carry network of FIGURE 4 is to insert the ripple carries generated as a result of the summation of the last partial product. At $TP_N$ the shift gates are inhibited and the gates 80, 82, 84, 86, 88, and 90 of the FIGURES 1*a*, 1*b*, and 1*c* are activated so that the outputs from the unit matrix half adders 26, 28, 30, 32, 34, and 36 will be directed to the unit adders 140, 142, 146, 148, 150 and 152, respectively, via the conductors of the cables 154, 156, 158, 160, 162, and 164. Final carries, which in the invention as shown are always ripple carries, need only be directed to stages 3, 4, 5 and 6 since no final carries are generated in stages 1 and 2 after the summation of the last partial product or operand. It is intuitively clear that no ripple carries are generated in stage 1 (the least significant digit) since no carries are injected into this stage. Stage 2 does not generate any final carries to be added into that stage since final carries are always added to the next higher order stage. It will be remembered that ripple carries occurring during the partial product summation, except for the last partial product summation are added to the same stage in which they are generated.

The final carry network of FIGURE 4 will inject the ripple carries into the next higher order and at the same time sense the higher orders to determine if ripple carries will be generated in those orders as a result of a ripple carry addition in a lower order. For example, if a ripple carry occurs on the conductor RC2′ (a ripple carry from the second stage) then a final carry will be injected into the third final carry circuit to the unit added 146 via the OR circuit 300. A final carry will appear on the 4FC (final carry to the fourth stage) to the unit adder 148 from the OR circuit 302 if a ripple carry is present on the RC3′ line or if a ripple carry is present on the RC2′ conductor and the 9 partial product conductor of the third stage (9PP3′) is activated. In other words, if a pulse is present on the RC2′ and the 9PP3′ line then the AND gate 301 will be activated in passing pulse to the OR circuit 302 which will result in a carry pulse being directed to the unit adder circuit 148 of the FIGURE 1.

In similar fashion, a carry pulse will be directed to the unit adder 150 of the fifth stage from the OR circuit 303 if a pulse is present of the conductor RC4′ or if a pulse of the conductor RC2′ and a pulse of the conductor 9PP3′ and on the conductor 9PP4′ to the AND gate 304 or if a pulse is present on the conductor RC3′ (a ripple carry from stage 3) and a pulse is present on the conductor 9PP4′ (the 9 digit partial product line of stage 4 is activated) to the AND gate 306, then an output will be directed to the OR circuit 303 to inject a carry into the unit adder 150 at $TP_N$.

Similarly, a final carry will be generated to the sixth or most significant digit stage (to the unit adder 152) of the R circuit 308 if a ripple carry is present on the conductor RC5′. In addition, as noted earlier, the circuit senses the lower order stages to determine if final carries will cause a carry into the next higher stage. This saves the time necessary for a final carry to ripple through the circuit by sensing the other stages and directly injecting a carry pulse if lower order stages would create ripple carries to upper order stages. A final carry is directed to the unit adder 152 of the FIGURE 1*c* if a pulse is presented on the conductor RC2′ and if the 9's conductor of the stages 3, 4, and 5 are activated. These pulses are directed to the AND circuit 310 which will generate an output if all four conditions are present. The inputs to the AND circuit 312 are the ripple carry from stage 3 (RC3′ and the 9's partial product conductors from stages 4 and 5). If the three inputs are present at the input of the gate 312, then a final carry will be generated from the OR circuit 308. If a ripple carry is present on the RC4′ conductor and the 9 partial product stage 5 conductor (9PP5′) conductor, then the AND gate 314 will generate a pulse to the unit adder 152 of the FIGURE 1*c* via the R circuit 308. Under no circumstances does more than one final carry pulse eminate from either of the OR circuits, 302, 303 or 308. The conditions are such that either a final carry pulse will be generated or no final carry pulse will be generated but never more than one pulse.

Referring now to Table I, there can be seen the normal method of manually deriving the product of two numbers is shown to determine the partial products to be added by the machine operation. The row entitled "stage" preceding the example as applied to the system of the present invention, refers to the stage of the adder wherein stage 1 is the least significant digit and stage 6 is the most significant digit. The rows entitled Matrix HA (half-adder) or unit matrix HA refer to the circuits of FIGURES 1*a*, 1*b*, and 1*c* and the digits (appearing below in that particular column refer to the digit appearing as an input or output from that unit.

As shown by the illustrative example, TP1 from the time pulse generator 170 of the FIGURE 1*a*, causes the first partial product to be transferred from the multiple generator 18 over the conductors of the cable 20 to the respective matrix half adders. In the particular example selected, the first partial product is 053604 and these digits are transferred respective to the stages 6, 5, 4, 3, 2 and 1. Since this is the first partial product to be entered, no pulses appear on the conductors of the cables 94″, 96″, 98″, 199″ and 102″. As shown in line 3 under TP1, the inputs to the unit matrix half adders on the conductors of the cables 38, 40, 42, 44, 46 and 48 remain the same. In addition, any carries or ripple carries are also entered to the unit matrix half adders at the same time; however, in the case of the intial entry, no carries or ripple carries would be generated. Lines 6 and 7 show the output of the respective unit matrix half adders. It will observed that any carries, normally generated at line 4, are carried into the next higher order but any ripple carries, shown on line 5, are carried into the same order but at the next time pulse. Herein lies one of the salient features of the invention.

It is to be noted at this time, that a carry is indicated by a C, thusly and no carry is indicated by $\overline{C}$. Similarly, a ripple carry is indicated thusly, RC and no ripple carry is indicated by $\overline{RC}$.

As shown at line 1 of TP2, the outputs from the unit matrix half adders are now presented as inputs to the matrix half adders shifted to the right by one order so that the number now appears as 005360. The 4 that was shifted out will be preserved by a storage register, not shown. The circuit elements and delays are such that upon presentation of the input of 005360 to the matrix half adders, TP2 will cause the transfer of the X partial product to arrive at the input of a matrix half adders at the same time. Thus as shown at line 2, of TP1, the next partial product, namely, 044670, will be added to the partial product thus accumulated so far. The outputs of the matrix half adders are shown at lines 3 and 4 and it will be noted that a carry was generated in stage 2 (or order 2) upon the summation of the digits 6 and 7. The outputs of the matrix half adders, along with any carry or ripple carry signals are presented as inputs to the unit matrix half adders as shown in lines 5, 6, and 7. When the carry from stage 2 is added to the digit 9 appearing in the stage 3, a ripple carry is generated which is shown in line 9. A ripple carry will not be added at this time but will be added at TP3, the next time pulse, as shown at line 7.

The summation continues as shown by the operation of under TP3. The sum partial products are shifted as shown on line 1 and presented as inputs to the matrix half adders coincidentally with the next partial product to be summed as shown on line 2. A carry is noted at line 4 and on lines 5, 6 and 7, there is shown in the inputs to the unit matrix half adders. The ripple carry generated during the previous summation is now summed with partial products as shown at line 7, the third stage. As here before noted, no condition exists wherein a ripple carry and a carry are to be added into the same order at the same time. This is true since a ripple carry is not generated until a carry has caused the next higher order to reach the radix of the numbering system employed. Thus, ripple carries only occur as a result of carries into higher orders and not upon summation of two operands or partial products.

The summation of the partial products continues until the final partial product has been coupled to the system and the final product, except for the final ripple carries, also known as final carries, have been entered and appear on the conductors of the cables 92, 94, 96, 98, 100 and 102. At this time, $TP_N$ will inhibit the gates 110, 112, 114, 116, 118, and prevent the further transfer of information to lower orders. At the same time, $TP_N$ will strobe the gates 80, 82, 84, 86, 88 and 90 and thus cause the transfer of the information to the unit adders 140, 142, 146, 148, 150 and 152 via the conductors of the cables 154, 156, 158, 160, 162 and 164. The function of the unit adders as hereinbefore described is to receive a pulse if final carries were generated and add them to the partial product at this time. As shown by the example at $TP_N$, line 1, pulses of the proper conductors representative of the decimal digit 06, 0185 are presented to the gates 80, 82, 84, 86, 88, and 90. Line 2 shows the ripple carries as derived on the conductors RC2, RC3, RC4, and RC5 which are coupled to strobe the gates 192, 190, 188, and 186 respectively, of the FIGURE 1*d*. In the final carry network as hereinbefore described, stages 3, 4, and 5 are sensed to determine if the 9's conductor has been activated. This is necessary in order to determine ripple carries which may occur in higher orders and are connected to the gates 184, 182 and 180 of the FIGURE 1*d* on the conductors 9PP3, 9PP4 and 9PP5 of the FIGURES 1*b* and 1*c*. These gates are strobed at $TP_N$ and if a pulse appears on a conductor coupled to a gate, an output from the gate will be generated to the final carry network 200. In the particular example selected, order 4 has generated a ripple carry thus causing the AND gate 188 to generate an output to the OR circuit 303 of the FIGURE 4 on the 5FC (final carry to the fifth order). It will be noted that ripple carries generated as a result of the summation of the final partial product are carried into the next higher order rather than at the same order, which is the case during normal partial product summation. This is shown in the illustrative example at lines 1, 2, and 3 wherein the final product of 070185 plus the digits 504 which were shifted to a final product register (not shown).

Thus, there has been described a parallel adder circuit adaptable for use in the addition of numbers in any radix, which circuit is particularly adaptable to the multiplication process as performed by over and over addition. Higher computation speeds have been obtained and the time normally necessary for ripple carries to propagate through the adders, has been materially reduced. Upon reaching a condition wherein a ripple carry must be summed, the ripple carry so generated during summation of a partial products is recirculated and added with the summed partial products at the occurrence of the next following time pulse. This is permissable since the summed partial products are shifted to the next lower order at the conclusion of the time pulse. Any ripple carries generated after all partial products have been summed are known as final carries and are added by a final carry network to the summed partial products at the last time pulse of the period. Since the carry network to perform ripple carries has been practically eliminated and the inherent delay associated with this operation diminished, faster computational speeds result. No cycle time is necessary for carries to ripple through the adder stages since the ripple carries are added in at the next following time pulse along with the summed partial product appearing at the input of the unit matrix half adders.

While there have been shown and described and pointed out the novel features of the invention as applied to a particular embodiment, it will be understood that various omissions and substitutions and changes in the form and details of the device illustrated and in its operation may be made by those skilled in the art, without departing from the spirit or scope of the invention.

What is claimed is:

1. In an adder of the type composed of a plurality of stages each stage capable of generating a sum signal and carry signals and each arranged to transfer certain outputs to successive stages, the improvement comprising means to generate and supply signals representative of a multi-digit number to said adder stages, control means coupled to said means to generate and to introduce the signals representative of the multi-digit number into said adder stages simultaneously with the arrival of the transferred sum output signals of the adder and means coupled to each stage for transferring any carry signals to a next higher stage or back to the same stage in a recirculating loop according to the type of carry signal that is generated.

2. In an adder comprised of a plurality of stages, each stage capable of generating a sum signal and carry signals and having input and output terminals, means to couple an output terminal of a stage to a first of said input terminals of a succeeding stage for transferring sum signals, means to introduce pulses indicative of a number to be added to a second of said input terminals of each stage, means interconnecting said stages for transferring carry signals within the same stage or to a higher order stage according to the type of carry signal that is generated and timing means to control the inputs to insure coincident application of said inputs at all of said input terminals.

3. An adder having stages each capable of generating a sum signal and carry signals and corresponding to the orders of a multi-digit number, means for supplying to said adder, signals representative of numbers to be added, means for transferring the sum signal of each of said adder stages to the next lower stage, means for transferring carry signals to a next higher stage or back to the same stage in a recirculating loop according to the type of carry signal that is generated, and timing means for controlling the coincident arrival at the designated stages of the transferred outputs and the signals representative of the numbers to be added.

4. An adder circuit comprising a plurality of stages for deriving a sum signal and carry signals from signals representative of multi-digit numbers, means to introduce a first multi-digit number into said stages, means to connect the sum signal derived by each stage to the next lower stage timing means to insure coincident application at each stage of said multi-digit signals and said sum signal and means for synchronously transferring the carry signals to a next higher stage or back to the same stage in a recirculating path according to the type of carry signal that is generated.

5. An adder unit comprising a plurality of stages for receiving signals representative of multi-digit numbers to be added and deriving sum and carry outputs, pulse means, transfer means under control of said pulse means for transferring said signals representative of the multi-digit numbers to said stages, a number to each stage, means coupled to all of said stages except the lowest stage for transferring the derived sum output from a stage to an adjacent lower stage coincident with the arrival of said signals representative of said multi-digit number to said stages from said transfer means, a recirculating path for each of said stages except the lowest stage, and additional means coupled to said stages for transferring certain carry outputs of a stage to an adjacent higher stage and others of said carry outputs through said recirculating path back to the same stage according to the type of carry output that is generated.

6. The combination as defined in claim 5 wherein said recirculating path of each stage includes a logical circuit element coupled to receive carry outputs from the adjacent lower stage and other carry outputs from the same stage.

7. An adder comprising a plurality of stages for deriving output signals composed of sum, carry and ripple carry signals from input signals which are representative of multi-digit numbers, means interconnecting said stages for the transfer of said output signals, said means including a recirculating loop for insertion of ripple carries, means for presenting input signals representative of numbers to be added to said stages, and timing means to control the means for presenting the signals to said stages.

8. The combination as defined in claim 7 wherein said means interconnecting said stages further comprises a transfer path from each stage to an immediate lower stage for the transfer of sum signals, and a second transfer path to an immediate higher stage for the transfer of a carry signal.

9. An adder stage for deriving partial product, carry, and ripple carry output signals from input signals, comprising means to apply input signals to said stage, means to obtain partial product and carry output signals from said stage as a result of said input signals, a recirculating path coupled from the output of the stage back to its input for inserting any ripple carry signals derived as a result of said input signals, and means coupled to said means to obtain, to shift the partial product and carry output signals from the adder stage.

10. An adder stage comprising a matrix half-adder for deriving sum and carry outputs in response to input signals, a unit matrix half-adder for deriving partial products and ripple carry outputs, means coupling the sum outputs of said matrix half-adder to the input of said unit matrix half-adder, means to transfer the carry outputs of said matrix half-adder to another higher similar adder stage, gating means coupled to said matrix half-adder for receiving partial products from the other higher similar adder stage, means to transfer the partial products derived from said unit matrix half-adder to another lower similar adder stage, a logical OR circuit for receiving the ripple carry output from said unit matrix half-adder and a carry signal from the other lower similar adder stage, the output of said logical OR circuit coupled to an input of said unit matrix half-adder, a signal generator coupled to said matrix half-adder for generating signals representative of digits to be added, and timing means coupled to said signal generator to permit application of the signals from said signal generator when the partial products from the other higher similar adder stages are presented to said matrix half-adder.

11. The combination as defined in claim 10 including a final carry network and means coupled between said final carry network and said unit matrix half-adder for deriving a final product.

References Cited by the Examiner

UNITED STATES PATENTS

| | | | |
|---|---|---|---|
| 2,879,001 | 3/59 | Weinberger et al. | 235—175 |
| 2,936,117 | 5/60 | Younker | 235—165 |
| 2,962,215 | 11/60 | Haynes | 235—175 |
| 2,966,305 | 12/60 | Rosenberger | 235—175 |
| 2,981,471 | 4/61 | Eachus | 235—175 |
| 3,055,586 | 9/62 | Davis | 235—160 |

OTHER REFERENCES

Pages 67–91; January, 1961, MacSorley: High Speed Arithmetic in Binary Computers, Proceedings of The IRE (Special Issue on Computers).

MALCOLM A. MORRISON, *Primary Examiner.*

WALTER W. BURNS, Jr., *Examiner.*